(12) United States Patent
Hanano et al.

(10) Patent No.: US 9,764,710 B2
(45) Date of Patent: Sep. 19, 2017

(54) GAS GENERATOR

(71) Applicant: DAICEL CORPORATION, Osaka-shi, Osaka (JP)

(72) Inventors: Teppei Hanano, Tatsuno (JP); Masayuki Yamazaki, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/029,033

(22) PCT Filed: Oct. 24, 2014

(86) PCT No.: PCT/JP2014/078293
§ 371 (c)(1),
(2) Date: Apr. 13, 2016

(87) PCT Pub. No.: WO2015/068586
PCT Pub. Date: May 14, 2015

(65) Prior Publication Data
US 2016/0257280 A1   Sep. 8, 2016

(30) Foreign Application Priority Data

Nov. 7, 2013 (JP) ................................ 2013-230803

(51) Int. Cl.
*C06D 5/00* (2006.01)
*B60R 21/264* (2006.01)

(52) U.S. Cl.
CPC .. *B60R 21/2644* (2013.01); *B60R 2021/2648* (2013.01)

(58) Field of Classification Search
CPC . B60R 21/264; B60R 2021/2648; F42B 3/04; B01D 2279/10

(Continued)

(56) References Cited

U.S. PATENT DOCUMENTS 5,005,486 A * 4/1991 Lenzen ............... B60R 21/2644
                                                          102/202.5
5,197,756 A * 3/1993 Jarboe ................. B60R 21/2644
                                                            280/728.1

(Continued)

FOREIGN PATENT DOCUMENTS

JP    2010-503576 A    2/2010
JP    2010-184559 A    8/2010

(Continued)

*Primary Examiner* — Samir Abdosh
(74) *Attorney, Agent, or Firm* — Birch, Stewart, Kolasch & Birch, LLP

(57) ABSTRACT

The present invention provides a gas generator, including:
  a cylindrical housing attached with an ignition device at one end and a diffuser portion, which has a gas discharge port, at the other end; and
  a combustion chamber charged with a molded article of a gas generating agent in the remaining space inside the cylindrical housing,
  the combustion chamber provided with a plurality of grooves serving as a gas discharge path,
  the plurality of the grooves serving as a gas discharge path being formed plurally and continuously in a longitudinal direction of the cylindrical housing and arranged in a circumferential direction of the cylindrical housing,
  a size of the grooves in the lateral direction being adjusted to be less than a minimum length of the molded article of the gas generating agent, and
  combustion gas, which is generated by combustion of the molded article of the gas generating agent at a time of actuation, flowing along the grooves serving as a gas discharge path and being discharged from the gas discharge port of the diffuser portion.

10 Claims, 4 Drawing Sheets

(58) Field of Classification Search
USPC .................. 102/530, 531; 280/736, 737, 741
See application file for complete search history.

(56) References Cited

U.S. PATENT DOCUMENTS

| | | | | |
|---|---|---|---|---|
| 6,095,559 | A * | 8/2000 | Smith | B60R 21/2644 102/704 |
| 6,481,357 | B1 * | 11/2002 | Lindner | B60R 21/264 102/530 |
| 6,520,538 | B2 * | 2/2003 | Katsuda | B60R 21/2644 280/735 |
| 7,237,801 | B2 * | 7/2007 | Quioc | B60R 21/2644 280/736 |
| 7,540,306 | B2 * | 6/2009 | Matsuda | F17C 5/06 141/3 |
| 7,878,536 | B2 * | 2/2011 | Rose | B60R 21/2644 280/737 |
| 2004/0262900 | A1 * | 12/2004 | Yoshida | B60R 21/2644 280/741 |
| 2006/0043716 | A1 * | 3/2006 | Quioc | B60R 21/2644 280/741 |
| 2010/0117345 | A1 * | 5/2010 | Mayville | B60R 21/2644 280/741 |
| 2010/0186617 | A1 * | 7/2010 | Zhang | B60R 21/264 102/530 |
| 2010/0201111 | A1 * | 8/2010 | Yamazaki | B60R 21/261 280/741 |
| 2010/0230942 | A1 * | 9/2010 | Rose | B60R 21/2644 280/736 |
| 2011/0248486 | A1 * | 10/2011 | Numoto | B60R 21/2644 280/741 |
| 2013/0233197 | A1 * | 9/2013 | Ozaki | B60R 21/2644 102/531 |

FOREIGN PATENT DOCUMENTS

| | | |
|---|---|---|
| JP | 2010-540336 A | 12/2010 |
| JP | 2013-184482 A | 9/2013 |
| WO | WO 03/042010 A1 | 5/2003 |
| WO | WO 2008/034807 A1 | 3/2008 |

* cited by examiner

[Fig. 1]
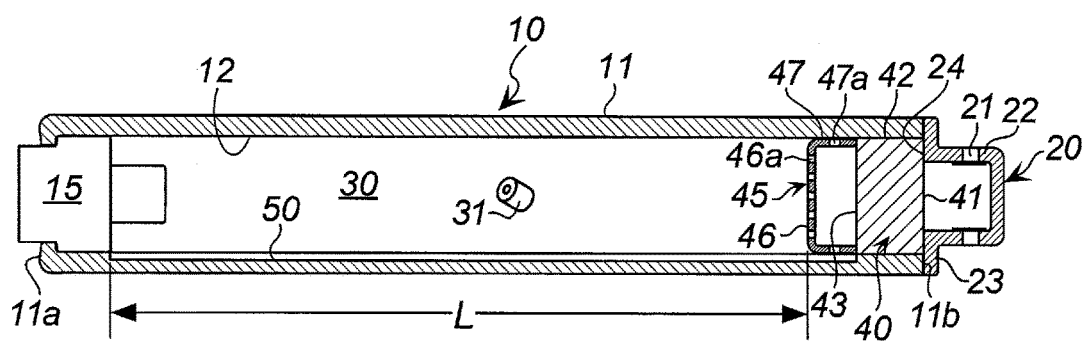
[Fig. 2]
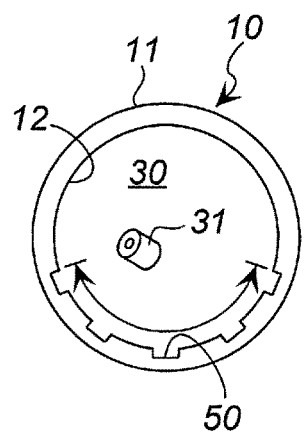

[Fig. 3]
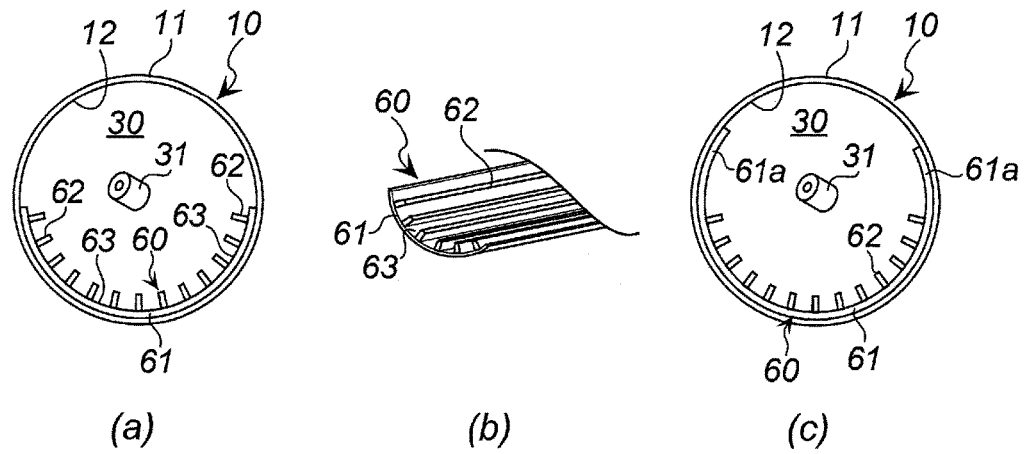
(a)　　　　　(b)　　　　　(c)
[Fig. 4]
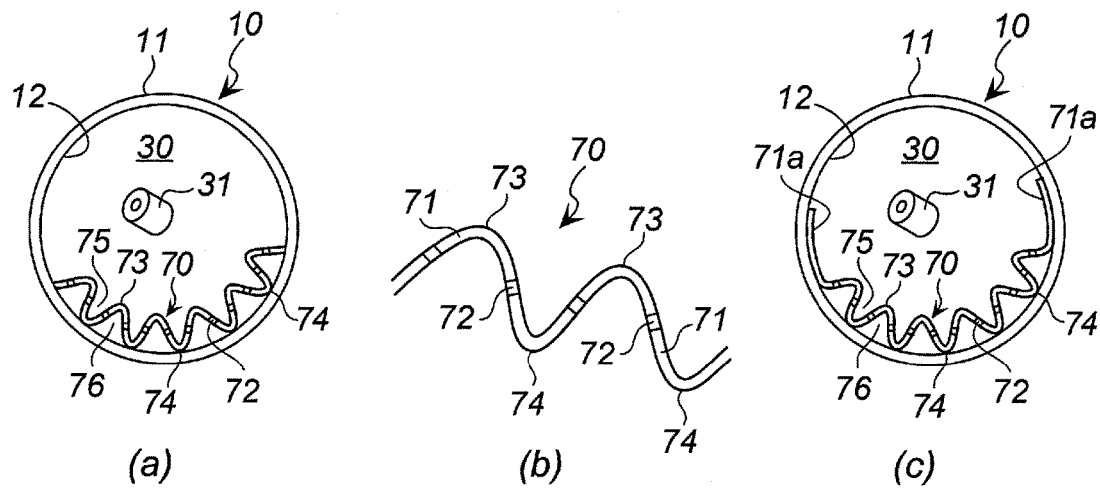
(a)　　　　　(b)　　　　　(c)

[Fig. 5]
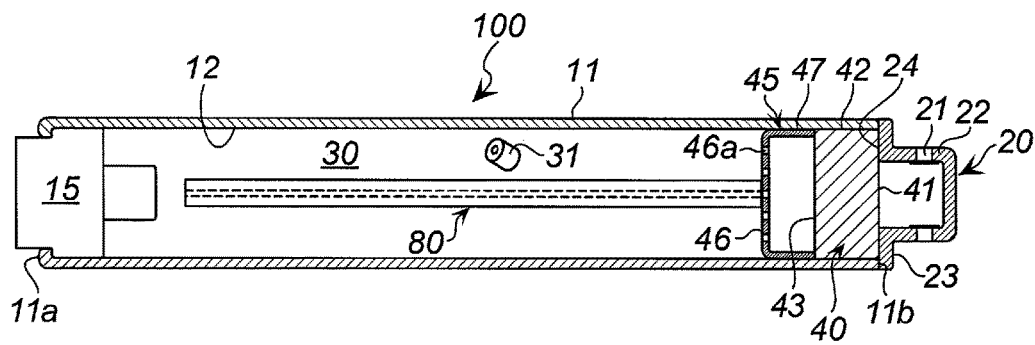
[Fig. 6]
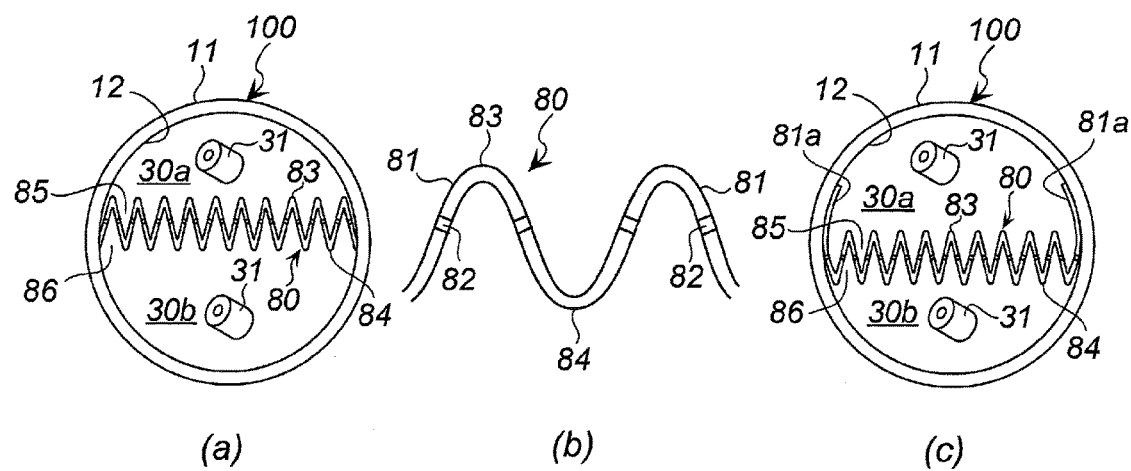
(a) (b) (c)

[Fig. 7]
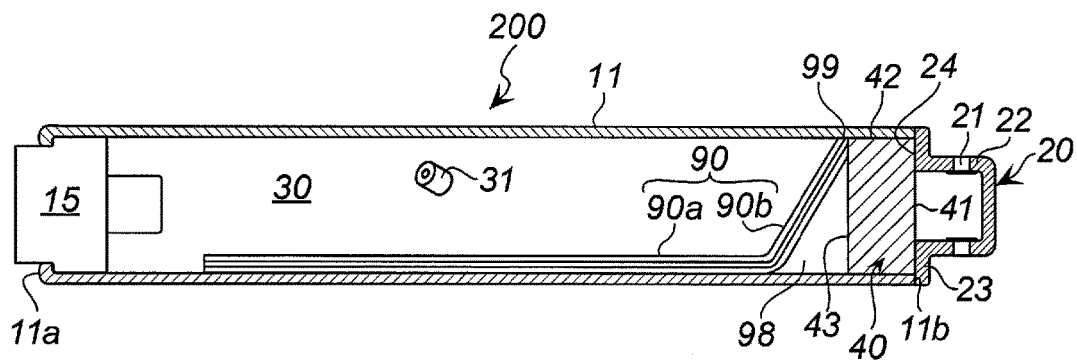
[Fig. 8]
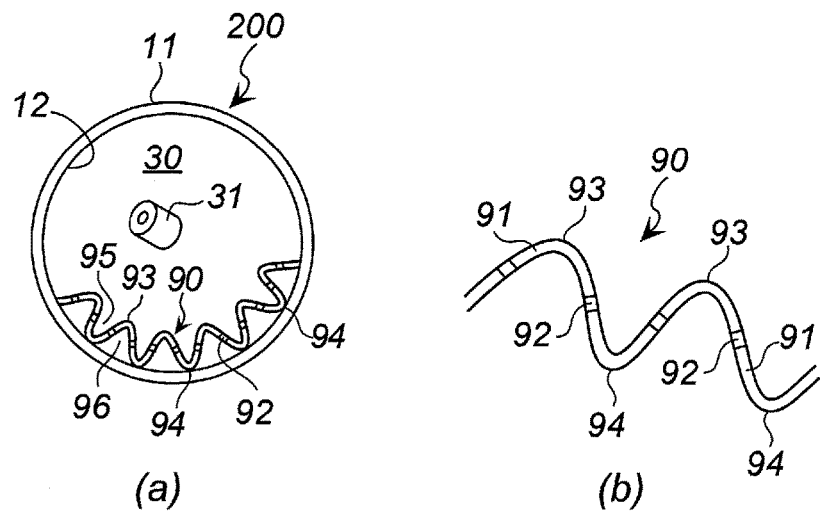
(a)         (b)

GAS GENERATOR

FIELD OF INVENTION

The present invention relates to a gas generator for use in an airbag apparatus.

DESCRIPTION OF RELATED ART

Among gas generators in which a gas generating agent is used as a gas source, the one employing an elongated cylindrical housing is widely used.

When such a cylindrical housing is used, a combustion chamber charged with a gas generating agent also has an elongated shape. Therefore, combustibility of the gas generating agent is important.

JP-A No. 2010-184559 discloses a gas generator in which a cylindrical member 30 is disposed inside a cylindrical housing 10, and a cylindrical gap 35 therebetween functions as a combustion gas passage.

JP-A No. 2013-184482 discloses a gas generator in which a plate-like partition member 20 is disposed inside a cylindrical housing 10 to separate the cylindrical housing into two chambers, namely, a gas generating agent charging space 38 and a gas flow channel space 40.

In the gas generator of either of the aforementioned inventions, an ability for ignition and combustion of the gas generating agent in the combustion chamber is improved.

SUMMARY OF INVENTION

The present invention provides
a gas generator, including:
a cylindrical housing attached with an ignition device at one end and a diffuser portion, which has a gas discharge port, at the other end; and
a combustion chamber charged with a molded article of a gas generating agent in the remaining space inside the cylindrical housing,
the combustion chamber provided with a plurality of grooves serving as a gas discharge path,
the plurality of the grooves serving as a gas discharge path being formed plurally and continuously in a longitudinal direction of the cylindrical housing and arranged in a circumferential direction of the cylindrical housing,
a size of the grooves in the lateral direction being adjusted to be less than a minimum length of the molded article of the gas generating agent, and
combustion gas, which is generated by combustion of the molded article of the gas generating agent at a time of actuation, flowing along the grooves serving as a gas discharge path and being discharged from the gas discharge port of the diffuser portion.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows an axial sectional view of the gas generator in accordance with the present invention;

FIG. 2 shows a radial sectional view of the gas generator depicted in FIG. 1;

FIG. 3 shows, in (a), a radial sectional view of the gas generator according to another embodiment of the present invention, in (b), a partial perspective view of a gas flow channel forming member used in (a) and, in (c), radial sectional view of the gas generator using a gas flow channel forming member different from that depicted in (a);

FIG. 4 shows, in (a), a radial sectional view of the gas generator according to yet another embodiment, in (b), a partial enlarged view of a gas flow channel forming member used in (a) and, in (c), a radial sectional view of the gas generator using a gas flow channel forming member different from that depicted in (a);

FIG. 5 shows an axial sectional view of the gas generator according to yet another embodiment;

FIG. 6 shows, in (a), a radial sectional view of the gas generator depicted in FIG. 5, in (b), a partial enlarged view of a gas flow channel forming member used in (a) and, in (c), a radial sectional view of the gas generator using a gas flow channel forming member different from that depicted in (a);

FIG. 7 shows an axial sectional view of the gas generator according to yet another embodiment; and FIG. 8 shows, in (a), a radial sectional view of the gas generator depicted in FIG. 7, in (b), a partial enlarged view of a gas flow channel forming member used in (a).

DETAILED DESCRIPTION OF THE INVENTION

The present invention is to provide a gas generator having a simple structure, enhancing the ability for ignition and combustion of the molded article of the gas generating agent and realizing smooth gas discharge by different means from the above related arts.

The plurality of the grooves serving as a gas discharge path are formed directly in the inner circumferential wall surface of the cylindrical housing (the combustion chamber) or formed by disposing, inside the combustion chamber, a separate member having the grooves.

The plurality of the grooves serving as a gas discharge path are adjusted such that the combustion gas generated from the gas generating agent present on the ignition device side flows as far as the diffuser portion.

The plurality of the grooves serving as a gas discharge path may be formed continuously over the entire length of the combustion chamber, but can be formed continuously within a range of 10% to 100%, preferably 30% to 100%, more preferably 40% to 100%, and particularly preferably 80% to 100% of the entire length of the combustion chamber.

When the length of the plurality of the grooves serving as a gas discharge path is 100% of the length of the combustion chamber, the grooves have a continuous length from the ignition device to the diffuser portion.

When the plurality of the grooves serving as a gas discharge path are not formed over the entire length of the combustion chamber (that is, in the case that the length of the grooves is not 100%), it is possible to form the grooves on the diffuser portion side, without forming the grooves on the ignition device side where the molded article of the gas generating agent is easily ignited and burned. Alternatively, the grooves may be formed within a range from the ignition device to the point in front of the diffuser portion (that is, without reaching the diffuser portion).

The plurality of the grooves serving as a gas discharge path may be formed entirely in the circumferential direction of the combustion chamber, but it is preferred that they are formed in a range of ¼ to ¾, more preferably ¼ to ½ of the circumference.

Further, a group of gas discharge path formed of the plurality of the grooves may be formed in a plurality of separate locations in the circumferential direction of the inner circumferential wall surface of the cylindrical housing.

Further, a group of gas discharge path formed of the plurality of the grooves may be formed in a plurality of separate locations in the circumferential direction of the inner circumferential wall surface of the cylindrical housing.

The size of the grooves in the lateral direction is adjusted to be less than a minimum length of the molded article of the gas generating agent.

Since a known molded article of the gas generating agent is used, the shape thereof is not particularly limited, and a disk-shaped or columnar article can be used.

Therefore, by adjusting the lateral size of the grooves to the abovementioned length, the molded article of the gas generating agent is prevented from entering the interior of the grooves and blocking the gas discharge path, regardless of a shape of the molded article of the gas generating agent.

When the plurality of the grooves are formed by a separate member inserted into the cylindrical housing, this member is retained by being held, for example, between the ignition device and the diffuser portion (when another member is present in front of the diffuser portion, then between the ignition device and this member) from both sides in the axial direction of the housing.

Since the housing serving as an outer shell is an elongated cylindrical housing, the combustion chamber provided inside thereof also has an elongated shape.

The interior of the elongated combustion chamber is charged, without gaps, with a predetermined amount of the molded article of the gas generating agent such that the article does not move.

At the time of actuation, the molded article of the gas generating agent facing the ignition device is ignited and burned first, and the combustion advances sequentially towards the diffuser portion.

In such a combustion process, the combustion gas generated by the combustion of the molded article of the gas generating agent moves from the ignition device side to the diffuser portion side through the plurality of the grooves serving as a gas discharge path. Therefore, even when the unburned molded article of the gas generating agent is present on the diffuser portion side in the combustion chamber, the combustion gas flows smoothly without blockade in the combustion chamber.

At the same time, the ability for ignition and combustion of the entire molded article of the gas generating agent charged in the combustion chamber is also improved.

Therefore, the volume of the combustion chamber (the volume for charging the molded article of the gas generating agent) is increased, while ensuring a minimum cross-sectional area of the gas discharge path. Further, the gas discharge path is formed relatively easily, and the parts used therefor are of a simple shape.

The preferable aspect 1 of the present invention is the gas generator in accordance with the present invention wherein the plurality of the grooves serving as a gas discharge path are formed in the inner circumferential wall surface of the cylindrical housing.

Since the plurality of the grooves serving as a gas discharge path are formed in the inner circumferential wall surface of the cylindrical housing, no separate member is used for forming the plurality of the grooves serving as a gas discharge path.

Where the plurality of the grooves serving as a gas discharge path are formed in the inner circumferential wall surface of the cylindrical housing, the strength of the portion where the grooves are formed is decreased. Taking this into account, it is possible to increase a thickness of the cylindrical housing in the portion where the grooves are formed.

The preferable aspect 2 of the present invention is the gas generator in accordance with the present invention wherein the plurality of the grooves serving as a gas discharge path are formed by a gas flow channel forming member, the gas flow channel forming member has a rectangular planar shape, and a cross-sectional shape thereof in a width direction is an arc-like or cylindrical shape including a concave-convex portion only on one surface, a distance between adjacent convex portions in the concave-convex portion is adjusted to be less than the minimum length of the molded article of the gas generating agent, and the gas flow channel forming member is disposed along an inner circumferential wall surface of the cylindrical housing.

In the preferable aspect of the present invention, the concave-convex portion of the gas flow channel forming member functions as the grooves serving as a gas discharge path.

In the preferable aspect of the present invention, the gas flow channel forming member may have a portion including no concavity and convexity, provided that the member has the concave-convex portion.

When the gas flow channel forming member is an arc of about ½ to ¾ of the circumference of the combustion chamber, the gas flow channel forming member may have the concave-convex portion formed over the entire range of the width direction, or the concave-convex portion formed within a range of ¼ to ½ of the circumference and the remaining portion formed with no concavity and convexity.

When the gas flow channel forming member has a cylindrical shape, the gas flow channel forming member may have the concave-convex portion formed within a range of ¼ to ⅔ of the circumference, preferably within a range of ¼ to ½ of the circumference and the remaining portion formed with no concavity and convexity.

The gas flow channel forming member is easily attached by insertion along the inner circumferential wall surface of the cylindrical housing (the combustion chamber).

The gas flow channel forming member disposed in the combustion chamber is fixed, for example, by being held from both sides in the circumferential direction between projections formed in the inner circumferential wall surface.

At the time of actuation, the molded article of the gas generating agent facing the ignition device is ignited and burned first, and the combustion advances sequentially towards the diffuser portion.

In such a combustion process, the combustion gas generated by the combustion of the molded article of the gas generating agent moves from the ignition device side to the diffuser portion side through the plurality of the grooves (the convex-concave portion of the gas flow channel forming member) serving as a gas discharge path. Therefore, the combustion gas flows smoothly, and at the same time, the ability for ignition and combustion of the entire molded article of the gas generating agent charged in the combustion chamber is also improved.

The preferable aspect 3 of the present invention is the gas generator in accordance with the present invention wherein the plurality of the grooves serving as a gas discharge path are formed by a gas flow channel forming member, the gas flow channel forming member has a rectangular planar shape, and a cross-sectional shape thereof in a width direction is an arc-like or cylindrical shape including a wavy portion, and the wavy portion has a plurality of through holes passing therethrough in a thickness direction, a distance between adjacent apexes of the wavy portion is adjusted to be less than the minimum length of the molded article of the gas generating agent, and the gas flow channel forming member is disposed along an inner circumferential wall surface of the cylindrical housing.

In the preferable aspect of the present invention, the wavy portion of the gas flow channel forming member functions as the grooves serving as a gas discharge path.

The portion including the apexes of the wavy portion is a rounded curved surface, but may be also angled (including acute angles) curved surface. The wavy portion may be formed of a quadrangle such as a trapezoid, a square, or a rectangle.

In the preferable aspect of the present invention, the gas flow channel forming member may have a portion including no wavy part, provided that the member has the wavy portion.

When the gas flow channel forming member is an arc of about ½ to ¾ of the circumference of the combustion chamber, the gas flow channel forming member may have the wavy portion formed over the entire range of the width direction, or the wavy portion formed within a range of ¼ to ½ of the circumference and the remaining portion formed with no wavy part.

When the gas flow channel forming member has a cylindrical shape, the gas flow channel forming member may have the wavy portion formed within a range of ¼ to ¾ of the circumference, preferably within a range of ¼ to ½ of the circumference and the remaining portion formed with no wavy part.

The gas flow channel forming member is easily attached by insertion along the inner circumferential wall surface of the cylindrical housing (the combustion chamber).

The gas flow channel forming member disposed in the combustion chamber is fixed, for example, by being held from both sides in the circumferential direction between projections formed in the inner circumferential wall surface.

By arranging the gas flow channel forming member along the inner circumferential wall surface of the cylindrical housing, there are formed grooves (inner grooves) which are formed by the wavy portion facing the interior of the combustion chamber and grooves (outer grooves) that are formed by the wavy portion facing the other side (the inner circumferential wall surface of the cylindrical housing).

The inner grooves and the outer grooves are communicated with each other by a plurality of communication holes passing through the wavy portion in the thickness direction thereof.

Thereby, at the time of actuation, the combustion gas generated in the combustion chamber moves through the inner grooves and enters the outer grooves from the plurality of the communication holes formed in the wavy portion, and the combustion gas which has entered the outer grooves reenters the inner grooves.

As described above, the combustion gas flows from the inner grooves to the outer grooves and from the outer grooves to the inner grooves repeatedly, thereby enhancing the ignition and combustion of the entire molded article of the gas generating agent in the combustion chamber, and the combustion residues contained in the combustion gas are easily attached to the gas flow channel forming member to be arrested.

The gas flow channel forming member including the wavy portion is manufactured, for example, by molding a porous plate by pressing into an arc-like or cylindrical shape having the wavy portion.

The preferable aspect 4 of the present invention is the gas generator in accordance with the present invention wherein the plurality of the grooves serving as a gas discharge path are formed by a gas flow channel forming member, the gas flow channel forming member has a cross-sectional shape in a width direction including a wavy portion, and has a plurality of communication holes passing through the wavy portion in a thickness direction thereof, a distance between adjacent apexes of the wavy portion is adjusted to be less than the minimum length of the molded article of the gas generating agent, and the gas flow channel forming member is disposed along the longitudinal direction of the cylindrical housing so as to divide the interior of the cylindrical housing into two spaces in the longitudinal direction.

In the preferable aspect of the present invention, the wavy portion of the gas flow channel forming member functions as the grooves serving as a gas discharge path.

In the preferable aspect of the present invention, the gas flow channel forming member may have a portion including no wavy part, provided that the member has the wavy portion, and the following forms thereof can be used.

(I) A gas flow channel forming member includes apexes at both surfaces of the wavy portion that are confined within a fixed range in the height direction. In other words, a gas flow channel forming member is entirely confined within a rectangle of a fixed width.

(II) A gas flow channel forming member is entirely wavy and has an arc-like shape.

(III) A gas flow channel forming member is the gas flow channel forming member (I) having curved surfaces at both end sides, which extend in different directions or the same direction and abut against the inner circumferential wall surface.

(IV) A gas flow channel forming member is the gas flow channel forming member (II) having curved surfaces at both end sides, which extend in different directions or the same direction and abut against the inner circumferential wall surface.

The gas flow channel forming member is disposed to divide the interior of the cylindrical housing (the combustion chamber) into two spaces along the longitudinal direction. A volume ratio of the separated two combustion chambers (a first combustion chamber and a second combustion chamber) is not particularly limited, but it is preferred that the two combustion chambers have about the same volume.

By arranging the gas flow channel forming member to divide the interior of the cylindrical housing (the combustion chamber) into two spaces along the longitudinal direction, there are formed grooves (first grooves) which are formed by the wavy portion facing the first combustion chamber and grooves (second grooves) which are formed by the wavy portion facing the second combustion chamber.

The first grooves and the second grooves are communicated with each other by a plurality of communication holes passing through the wavy portion in the thickness direction thereof.

At the time of actuation, the combustion gas generated in the combustion chamber moves through the first grooves and the second grooves, and moves from the first grooves to the second grooves and from the second grooves to the first grooves through the plurality of the communication holes formed in the wavy portion.

As described above, the combustion gas flows from the first grooves to the second grooves and from the second grooves to the first grooves repeatedly, thereby enhancing the ignition and combustion of the entire molded article of the gas generating agent in the combustion chamber.

The gas flow channel forming member including the wavy portion is manufactured, for example, by molding a porous plate by pressing to have the wavy portion.

The preferable aspect 5 of the present invention is the gas generator in accordance with the present invention, wherein the plurality of the grooves serving as a gas discharge path are formed by a gas flow channel forming member, the gas flow channel forming member has:
a rectangular planar shape;
a side surface shape including a flat plate portion and an inclined plate portion that is formed on a side of the diffuser portion;
an arc-like cross-sectional shape in a width direction including a wavy portion, and a plurality of communication holes passing through the wavy portion in the thickness direction thereof; and
a distance between adjacent apexes of the wavy portion, which is adjusted to be less than the minimum length of the molded article of the gas generating agent,
in the gas flow channel forming member, the inclined plate portion is positioned on the side of the diffuser portion, and the flat plate portion is disposed along an inner circumferential wall surface of the cylindrical housing, and
a space having an axially triangular cross-sectional shape and charged with no molded article of the gas generating agent is present between the inclined plate portion and the inner circumferential wall surface of the cylindrical housing.

In the preferable aspect of the present invention, the wavy portion of the gas flow channel forming member functions as the grooves of the gas discharge path.

In the preferable aspect of the present invention, the gas flow channel forming member may have a portion including no wavy part, provided the member has a wavy portion.

In particular, when the gas flow channel forming member at the flat plate portion has an arc of about ½ to ¾ of the circumference of the combustion chamber, the gas flow channel forming member may have
the wavy portion formed over the entire range of the width direction, or
the wavy portion formed within a range of ¼ to ½ of the circumference and the remaining portion formed with no wavy part.

The gas flow channel forming member is easily attached by insertion such that the inclined plate portion is positioned on the diffuser portion side and the flat plate portion is along the inner circumferential wall surface of the cylindrical housing (the combustion chamber).

Further, a space (a triangular space) having an axially triangular cross-sectional shape and charged with no molded article of the gas generating agent is present between the inclined plate portion and the inner circumferential wall surface of the cylindrical housing.

The gas flow channel forming member disposed in the combustion chamber is fixed, for example, by being held from both sides in the circumferential direction between projections formed in the inner circumferential wall surface.

By arranging the gas flow channel forming member along the circumferential wall surface of the cylindrical housing, there are formed grooves (inner grooves) which are formed by the wavy portion facing the interior of the combustion chamber and grooves (outer grooves) which are formed by the wavy portion facing the other side (the inner circumferential wall surface of the cylindrical housing).

The inner grooves and the outer grooves are communicated with each other by a plurality of communication holes passing through the wavy portion in the thickness direction thereof.

Thereby, at the time of actuation, the combustion gas generated in the combustion chamber moves through the inner grooves and enters the outer grooves from the plurality of the communication holes formed in the wavy portion, and the combustion gas which has entered the outer grooves reenters the inner grooves.

As described above, the combustion gas flows from the inner grooves to the outer grooves and from the outer grooves to the inner grooves repeatedly, thereby enhancing the ignition and combustion of the entire molded article of the gas generating agent in the combustion chamber, and the combustion residues contained in the combustion gas are easily attached to the gas flow channel forming member to be arrested.

Since the combustion gas generated inside the combustion chamber flows into the triangular space through the communication holes of the gas flow channel forming member, the gas easily flows into the diffuser portion.

The preferable aspect 6 of the present invention is the gas generator according to any one of the present invention and the preferable aspects 1 to 5 of the present invention, in which a filter is disposed between the diffuser portion and the combustion chamber charged with the molded article of the gas generating agent inside the cylindrical housing.

The filter has functions of filtering and cooling the combustion gas, and a known filter for a gas generator is used.

The preferable aspect 7 of the present invention is the gas generator according to any one of the present invention and the preferable aspects 1 to 5 of the present invention, in which a filter is disposed between the diffuser portion and the combustion chamber charged with the molded article of the gas generating agent inside the cylindrical housing, and a partition wall having a through hole is disposed between the filter and the combustion chamber, spaced in an axial distance from the filter.

Since the partition wall is disposed between the filter and the combustion chamber, and the partition wall and the filter are disposed at an axial distance from each other, a space is formed therebetween.

Where such a space is present, when the combustion gas flows from the combustion chamber into the space through the partition wall, the combustion gas passes uniformly through the entire surface of the filter. As a result, the filtration and cooling functions are well exhibited.

When a gas generator having the above-mentioned triangular space is used, the inclined plate portion of the gas flow channel forming member acts in the same manner as the partition wall, so that the partition wall is not needed.

With the gas generator in accordance with the present invention, the entire molded article of the gas generating agent in the combustion chamber is easily ignited and burned.

Further, a large space (a volume of the combustion chamber) is ensured for charging the molded article of the gas generating agent, while maintaining a minimum cross-sectional area necessary for the combustion gas discharge path.

Description of Embodiments (1) Gas generator depicted in FIG. 1 and FIG. 2

In a gas generator 10, an electric igniter 15 serving as an ignition device is attached at one end 11a of a cylindrical housing 11, and a diffuser portion 20 having a gas discharge port 21 is attached at the other end 11b.

The gas discharge port 21 is closed from the inside by a metal tape such as an aluminum tape.

The cylindrical housing 11 and the diffuser portion 20 are formed of metal such as iron.

The electric igniter 15 is one used in a known gas generator.

The diffuser portion 20 has a cup 22 and a flange 23, and is fixed by welding the flange portion 23 to the end portion (the other end) 11b of the cylindrical housing.

An annular step portion 24 formed by an annular surface of the flange 23 is formed between the cylindrical housing 11 and the diffuser portion 20.

A combustion chamber 30 of an elongated shape is formed between the igniter 15 and the diffuser portion 20 inside the cylindrical housing 11, and the interior of the combustion chamber is charged, without gaps, with a required amount of a molded article of a gas generating agent 31.

In the embodiment depicted in FIG. 1, a disk-shaped filter 40 and a cup-shaped partition wall 45 are disposed between the combustion chamber 30 and the diffuser portion 20.

The filter 40 is arranged such that one end surface 41 thereof on the side of the diffuser portion 20 is abutted against the annular step portion 24 and that a circumferential surface 42 is abutted against the inner circumferential wall surface 12 of the cylindrical housing.

The other end surface 43 of the filter 40 is abutted against an opening of the cup-shaped partition wall 45.

The cup-shaped partition wall 45 includes a bottom surface 46 and a circumferential surface 47, and the bottom surface 46 and the circumferential surface 47 have a plurality of through holes 46a and a plurality of through holes 47a, respectively.

The interior of the cup-shaped partition wall 45 is not charged with the molded article of the gas generating agent 31, and a disk-shaped space is present therein.

Grooves 50 continuous in the axial direction are formed in part of the inner circumferential wall surface 12 of the cylindrical housing where the combustion chamber 30 and the cup-shaped partition wall 45 are arranged. The grooves 50 function as a gas discharge path.

The grooves 50 are formed over the entire range with a length L of the combustion chamber 30 and also in the portion which is in contact with the circumferential surface 47 of the cup-shaped partition wall 45. The grooves 50 can be formed over the entire range with a length L of the combustion chamber 30 (from the electric igniter 15 to the bottom surface 46 of the cup-shaped partition wall 45), and in this case, the through holes 47a of the circumferential surface 47 of the cup-shaped partition wall 45 are not needed.

As depicted in FIG. 2, the plurality (five in FIG. 2) of the grooves 50 are formed in a range of about ⅓ of the entire circumference, and arranged equidistantly in the circumferential direction.

The width of the grooves 50 is adjusted to be less than the minimum length of the molded article of the gas generating agent 31. Since the minimum length of the molded article of the gas generating agent 31 depicted in FIG. 1 and FIG. 2 is the diameter thereof, the width of the grooves 50 is adjusted to be less than the diameter. Therefore, the molded article of the gas generating agent 31 is prevented from entering the grooves 50 and blocking the gas discharge path.

The operation of the gas generator 10 depicted in FIG. 1 and FIG. 2 will be explained.

When the igniter 15 is actuated, the molded article of gas generating agent 31 starts the ignition and combustion at a portion in contact with the igniter 15, and the combustion successively advances towards the diffuser portion 20.

In the combustion process, the combustion gas generated by the combustion of the molded article of the gas generating agent 31 passes through the plurality of the grooves 50 serving as a gas discharge path and moves from the igniter 15 side to the diffuser portion 20 side, and in the movement process, the molded article of the gas generating agent 31 facing the grooves 50 is ignited and burned.

As a result of such a discharge of the combustion gas by the grooves 50, the combustion gas flows out effectively, and the gas discharge path is not blocked by the unburned molded article of the gas generating agent 31 (positioned on the diffuser portion 20 side). At the same time, the ability for the ignition and combustion of entire molded article of the gas generating agent 31 charged in the combustion chamber 30 is also improved.

Further, the combustion gas inside the combustion chamber 30 enters the space inside the cup-shaped partition wall 45 via the through holes 46a of the bottom surface 46 of the cup-shaped partition wall, and part of the combustion gas that passes through the grooves 50 also enters the space inside the cup-shaped partition wall 45 via the through holes 47a of the circumferential surface 47 of the cup-shaped partition wall.

After the combustion gas enters the space inside the cup-shaped partition wall 45, the combustion gas passes through the entire surface of the filter 40 to be filtered and cooled, and then, the combustion gas enters the diffuser portion 20 and is discharged from the gas discharge port 21.

Since the plurality of the through holes 47a are formed equidistantly over the entire circumference in the circumferential surface 47 of the cup-shaped partition wall, some of the through holes 47a are maintained in a state of facing the grooves 50 even when the cup-shaped partition wall 47 is rotated by vibrations applied to the gas generator 10.

In the embodiment depicted in FIG. 1, an example is depicted in which a plurality of grooves 50 are formed as a group in part of the inner circumferential wall surface 12 (within a range of ½ or less of the entire circumference). Such groups may be formed separately at plural locations in the inner circumferential wall surface 12. Thus, in the gas generator depicted in FIGS. 1 and 2, a large combustion chamber 30, which serves as the filling space for the molded article of the gas generating agent 31, is obtained while maintaining the gas discharge path.

(2) Gas generator depicted in FIG. 1 and FIG. 3

In the gas generator 10 depicted in FIG. 1, a gas flow channel forming member 60 depicted in (a) and (b) in FIG. 3 can be disposed at the inner circumferential wall surface 12 of the cylindrical housing 11 instead of forming the plurality of the grooves 50 in the inner circumferential wall surface 12 of the cylindrical housing 11.

The gas flow channel forming member 60 has a plurality of convex portions 62 formed axially (along the longitudinal direction of the cylindrical housing 11) only on one surface of an arc-like base plate 61, and arranged at intervals in the circumferential direction.

A plurality of grooves (concave portions) 63 continuous axially are formed in the circumferential direction between the plurality of the convex portions 62, and the grooves 63 serve as a gas discharge path.

As depicted in (a) in FIG. 3, the width of the arc-like base plate 61 of the gas flow channel forming member 60 is adjusted to be within a range of about ⅓ to ½ of the entire circumference of the cylindrical housing 11.

The distance between the adjacent convex portions 62 is adjusted to be less than the minimum length of the molded article of the gas generating agent 31.

The gas flow channel forming member 60 has a rectangular planar shape and can be set within the length range same as that of the grooves 50 depicted in FIG. 1.

As depicted in (c) in FIG. 3, the gas flow channel forming member 60 may have the convex portions 62 formed partially on one surface of the arc-like base plate 61, and a curved surface portion 61a in which no convex portions 62 are formed.

The gas flow channel forming member 60 is disposed such that the surface of the arc-like base plate 61 where the convex portions 62 are not formed is placed along the inner circumferential wall surface 12 of the cylindrical housing.

For example, the gas flow channel forming member 60 may be fixed such that one end portion thereof on the igniter 15 side abuts against the igniter 15 and the opposite end portion thereof abuts against the other end surface 43 of the filter 40.

The operation of the gas generator 10 depicted in FIG. 1 and FIG. 3 will be explained hereinbelow.

When the igniter 15 is actuated, the molded article of the gas generating agent starts the ignition and combustion at a portion in contact with the igniter 15, and the combustion successively advances towards the diffuser portion 20.

In the combustion process, the combustion gas generated by the combustion of the molded article of the gas generating agent 31 passes through the plurality of the grooves 63 serving as a gas discharge path and moves from the igniter 15 side to the diffuser portion 20 side. In the movement process, the molded article of the gas generating agent 31 facing the grooves 63 is ignited and burned.

With the grooves 63 acting to discharge the combustion gas, the combustion gas flows out smoothly, and the gas discharge path is not blocked by the unburned molded article of the gas generating agent 31 (positioned on the diffuser portion 20 side).

At the same time, the ability for ignition and combustion of the entire molded article of the gas generating agent 31 charged in the combustion chamber 30 is also improved.

Further, the combustion gas in the combustion chamber 30 enters the space inside the cup-shaped partition wall 45 via the through holes 46a in the bottom surface 46 of the cup-shaped partition wall, and part of the combustion gas that passes through the grooves 63 also enters the space inside the cup-shaped partition wall 45 via the through holes 47a in the circumferential wall 47 of the cup-shaped partition wall.

After the combustion gas enters the space inside the cup-shaped partition wall 45, the combustion gas passes through the entire surface of the filter 40 to be filtered and cooled, and then, the combustion gas enters the diffuser portion 20 and is discharged from the gas discharge port 21.

Since the plurality of the through holes 47a are formed equidistantly over the entire circumference in the circumferential surface 47 of the cup-shaped partition wall, some of the through holes 47a are maintained in a state of facing the grooves 63 even when the cup-shaped partition wall 45 is rotated by vibrations applied to the gas generator 10.

In FIG. 3, the arc-like base plate 61 abuts against the inner circumferential wall surface 12. Such a structure is also possible that the arc-like base plate 61 is formed with a plurality of holes of a size such that the molded article of the gas generating agent does not pass therethrough, the convex portions 62 abut against the inner circumferential wall surface 12 and the space between the convex portions 62 and the inner circumferential wall surface 12 serves as the combustion gas discharge path (grooves 63).

(3) Gas generator depicted in FIG. 1 and FIG. 4

In the gas generator 10 depicted in FIG. 1, a gas flow channel forming member 70 depicted in (a) and (b) in FIG. 4 can be used instead of forming the plurality of the grooves 50 in the inner circumferential wall surface 12 of the cylindrical housing 11.

The gas flow channel forming member 70 depicted in (a) and (b) in FIG. 4 has a rectangular planar shape and includes a wavy base plate 71 and a plurality of communication holes 72 passing through the wavy base plate 71 in the thickness direction thereof.

The communication holes 72 are formed in the surface of the wavy base plate 71 where apexes 73 on one side and apexes 74 on the other side are not present. However, the communication holes 72 can be formed in the apexes 73 on one side.

As depicted in (a) in FIG. 4, the width of the wavy base plate 71 of the gas flow channel forming member 70 is adjusted to be about ⅓ of the entire circumference of the cylindrical housing 11.

The distance between the adjacent apexes 73 is adjusted to be less than the minimum length of the molded article of the gas generating agent 31.

The wavy base plate 71 has an arc-like shape as a whole such as to be arranged along the inner circumferential wall surface 12 of the cylindrical housing.

The gas flow channel forming member 70 can also have a non-wavy but curved surface portion 71a at each end of the wavy base plate 71, as depicted in (c) in FIG. 4. The curved surface portion 71a abuts against the inner circumferential wall surface 12 of the cylindrical housing 11.

The gas flow channel forming member 70 is disposed such that the apexes 74 on the other side are in contact with the inner circumferential wall surface 12 of the cylindrical housing. Thereby, the gas flow channel forming member has inner grooves 75, which are formed by the wavy base plate 71 and faces the combustion chamber 30, and outer grooves 76 which are formed by the wavy base plate 71 and faces the other side (the inner circumferential wall surface 12 of the cylindrical housing).

Further, the inner grooves 75 and the outer grooves 76 are communicated with each other by the plurality of the communication holes 72 formed in the thickness direction in the wavy base plate 71.

Thereby, the combustion gas generated in the combustion chamber 30 at the time of actuation moves in the axial direction through the inner grooves 75. At the same time, from the plurality of the communication holes 72 formed in the wavy base plate 71, the combustion gas enters the outer grooves 76 and the gas which has entered the outer grooves 76 reenters the inner grooves 75.

As described above, the combustion gas flows from the inner grooves 75 to the outer grooves 76 and from the outer grooves 76 to the inner grooves 75 repeatedly, thereby enhancing the ignition and combustion of the entire molded article of the gas generating agent 31 in the combustion chamber 30, and the combustion residues contained in the combustion gas are attached to the gas flow channel forming member 70 to be easily arrested.

The above gas flow channel forming members 70 may be disposed at plural positions in the circumferential direction along the inner circumferential wall surface 12.

(3) Gas generator depicted in FIG. 5 and FIG. 6

In a gas generator 100 depicted in FIG. 5, a gas flow channel forming member 80 depicted in (a) and (b) in FIG. 6 is disposed as depicted in FIG. 5, instead of forming the plurality of the grooves 50 in the inner circumferential wall surface 12 of the cylindrical housing 11 in the gas generator 10 depicted in FIG. 1. However, the cup-shaped partition wall 45 used in the gas generator 100 in FIG. 5 does not have the through holes 47a in the circumferential surface 47.

The gas flow channel forming member 80 depicted in (a) and (b) in FIG. 6 has a rectangular planar shape and includes a wavy base plate 81 and a plurality of communication holes 82 passing through the wavy base plate 81 in the thickness direction thereof.

The communication holes 82 are formed in the surface of the wavy base plate 81 where apexes 83 on one side and apexes 84 on the other side are not present. However, the communication holes 82 can be formed in the apexes 83 on one side and apexes 84 on the other side.

The respective distances between the adjacent apexes 83 and between the adjacent apexes 84 are adjusted to be less than the minimum length of the molded article of the gas generating agent 31.

In (a) and (b) in FIG. 6, the wavy base plate 81 is arranged as a whole such that the apexes 83 and the apexes 84 are within a range of a certain width, but the base plate may be also formed as a whole in an arc-like shape such as depicted in (a) in FIG. 4.

The gas flow channel forming member 80 can also have a non-wavy but curved surface portion 81a at each end of the wavy base plate 81, as depicted in (c) in FIG. 6. The curved surface portion 81a can abut against the inner circumferential wall surface 12.

The gas flow channel forming member 80 is disposed such that one end thereof abuts against the bottom surface 46 of the cup-shaped partition wall and both ends in the width direction abut against the inner circumferential wall surface 12 of the cylindrical housing. In such a state, the interior of the cylindrical housing 11 (the combustion chamber 30) is divided in two spaces along the longitudinal direction. Since the combustion chamber 30 is charged, without gaps, with the molded article of the gas generating agent 31, the gas flow channel forming member 80 is supported by the molded article of the gas generating agent 31.

The gas flow channel forming member 80 can be also supported at both ends in the longitudinal direction by porous pillars (with through holes for the combustion gas) abutting against the inner circumferential wall surface 12.

Most of the combustion chamber 30 is partitioned by the gas flow channel forming member 80 into a first combustion chamber 30a and a second combustion chamber 30b.

First grooves 85 formed of concave portions between the adjacent apexes 83 of the wavy base plate 81 are obtained in the second combustion chamber 30a.

Second grooves 86 formed of concave portions between the adjacent apexes 84 of the wavy base plate 81 are obtained in the first combustion chamber 30b.

The first grooves 85 and the second grooves 86 are communicated with each other by the plurality of the communication holes 82 formed in the thickness direction in the wavy base plate 81.

Thereby, the combustion gas generated in the combustion chamber 30 (the first combustion chamber 30a and the second combustion chamber 30b) at the time of actuation moves in the axial direction through the first grooves 85 and the second grooves 86. At the same time, from the plurality of the communication holes 82 formed in the wavy base plate 81, the combustion gas enters the second grooves 86 after entering the first grooves 85 and also enters the first grooves 85 after entering the second grooves 86.

As described above, the combustion gas flows from the first grooves 85 to the second grooves 86 and from the second grooves 86 to the first grooves 85 repeatedly, thereby enhancing the ignition and combustion of the entire molded article of the gas generating agent 31 in the combustion chamber 30.

The grooves 50 depicted in FIG. 2 can be formed, or the gas flow channel forming member 60 depicted in FIG. 3 can be disposed, or the gas flow channel forming member 70 depicted in FIG. 4 can be disposed in the inner circumferential wall surface 12 of either one or both of the first combustion chamber 30a and the second combustion chamber 30b. In such a case, the through holes 47a can be also formed in the circumferential surface 47 of the cup-shaped partition wall 45 in the same manner as depicted in FIG. 1.

(4) Gas generator depicted in FIG. 7 and FIG. 8

In a gas generator 200 depicted in FIG. 7, a gas flow channel forming member 90 is disposed as depicted in FIG. 7, instead of forming the plurality of the grooves 50 in the inner circumferential wall surface 12 of the cylindrical housing 11 in the gas generator 10 depicted in FIG. 1. However, the cup-shaped partition wall 45 is not used in the gas generator 200 depicted in FIG. 7.

The gas flow channel forming member 90 has a rectangular planar shape, and a side surface shape thereof includes a flat plate portion 90a and an inclined plate portion 90b formed on one end side thereof.

The cross-sectional shapes, in the width direction, of the flat plate portion 90a and the inclined plate portion 90b of the gas flow channel forming member 90 are depicted in (a) and (b) in FIG. 8 and are structured in the same manner as depicted in (a) and (b) in FIG. 4.

The gas flow channel forming member 90 has a wavy base plate 91 and a plurality of communication holes 92 passing through the wavy base plate 91 in the thickness direction thereof.

The communication holes 92 are formed in the surface of the wavy base plate 91 where apexes 93 on one side and apexes 94 on the other side are not present. However, the communication holes 92 can be formed in the apexes 93 on one side in the flat plate portion 90a, and the communication holes 92 can be also formed in the apexes 93 on one side and in the apexes 94 on the other side in the inclined plate portion 90b.

The distance between the adjacent apexes 93 is adjusted to be less than the minimum length of the molded article of the gas generating agent 31.

The wavy base plate 91 of the flat plate portion 90a has an arc-like shape as a whole such as to be arranged along the inner circumferential wall surface 12 of the cylindrical housing.

The inclined plate portion 90b has the same shape as the flat plate portion 90a.

The gas flow channel forming member 90 may have the cross-sectional shape such as depicted in (c) in FIG. 4.

The flat plate portion 90a of the gas flow channel forming member 90 is disposed such that the apexes 94 on the other side are in contact with the inner circumferential wall surface 12 of the cylindrical housing.

Thereby, the flat plate portion 90a has inner grooves 95, which are formed by the wavy base plate 91 facing the combustion chamber 30 and outer grooves 96 which are formed by the wavy base plate 91 facing the other side (the inner circumferential wall surface 12 of the cylindrical housing).

Further, the inclined plate portion 90b of the gas flow channel forming member 90 is disposed such that an arc-like tip 99 abuts against the boundary portion of the filter 40 and the inner circumferential wall surface 12 of the cylindrical housing.

Thereby, a space (a triangular space) 98, having a triangular sectional shape in the axial direction and no molded article of the gas generating agent 31 charged, is obtained between the inclined plate portion 90b and the inner circumferential wall surface 12 of the cylindrical housing. This triangular space 98 corresponds to the space formed by the cup-shaped partition wall 45 and the filter 40 in the gas generator 10 depicted in FIG. 1.

The inner grooves 95 and the outer grooves 96 are communicated with each other by the plurality of the communication holes 92 formed in the thickness direction in the wavy base plate 91.

Thereby, the combustion gas generated in the combustion chamber 30 at the time of actuation moves in the axial direction through the inner grooves 95. At the same time, from the plurality of the communication holes 92 formed in the wavy base plate 91, the combustion gas enters the outer grooves 96 and the gas which has entered the outer grooves 96 reenters the inner grooves 95.

As described above, the combustion gas flows from the inner grooves 95 to the outer grooves 96 and from the outer grooves 96 to the inner grooves 95 repeatedly, thereby enhancing the ignition and combustion of the entire molded article of the gas generating agent 31 in the combustion chamber 30.

Further, since the combustion gas generated in the combustion chamber 30 enters the triangular space 98 through the gas flow channel forming member 90, the combustion gas passes through the entire surface of the filter 40 to be filtered and cooled, and then, the combustion gas enters the diffuser portion 20 and is discharged from the gas discharge port 21.

The gas generator in accordance with the present invention is not limited to the above embodiments, provided that the predetermined effect is obtained.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   a cylindrical housing, an ignition device attached at one end of the housing and a diffuser portion comprising a gas discharge port attached at the other end; and
   a combustion chamber charged with a gas generating agent in the remaining space inside the cylindrical housing, said gas generating agent being in the form of molded articles,
   the combustion chamber provided with a plurality of grooves serving as a gas discharge path,
   the plurality of the grooves serving as a gas discharge path being formed continuously in a longitudinal direction of the cylindrical housing and arranged in a range of one-fourth to three-fourths of the circumference of the cylindrical housing in a circumferential direction of the cylindrical housing,
   a size of each groove in the lateral direction being less than the smallest dimension of the molded articles of the gas generating agent, and
   combustion gas, which is generated by combustion of the molded article of the gas generating agent at a time of actuation, flowing along the grooves serving as a gas discharge path and being discharged from the gas discharge port of the diffuser portion.

2. The gas generator according to claim 1, wherein the plurality of the grooves serving as a gas discharge path are formed in inner circumferential wall surface of the cylindrical housing.

3. The gas generator according to claim 1, wherein the plurality of the grooves serving as a gas discharge path are formed by a gas flow channel forming member,
   the gas flow channel forming member has a rectangular planar shape and a cross-sectional shape thereof in a width direction is an arc-like or cylindrical shape including a concave-convex portion only on one surface,
   a distance between adjacent convex portions in the concave-convex portion is adjusted to be less than the minimum length of the molded article of the gas generating agent, and
   the gas flow channel forming member is disposed along an inner circumferential wall surface of the cylindrical housing.

4. The gas generator according to claim 1, wherein the plurality of the grooves serving as a gas discharge path are formed by a gas flow channel forming member,
   the gas flow channel forming member has a rectangular planar shape, and a cross-sectional shape thereof in a width direction is an arc-like or cylindrical shape including a wavy portion, and the wavy portion has a plurality of through holes passing therethrough in a thickness direction,
   a distance between adjacent apexes of the wary portion is adjusted to be less than the minimum length of the molded article of the gas generating agent, and
   the gas flow channel forming member is disposed along an inner circumferential wall surface of the cylindrical housing.

5. The gas generator according to claim 1, wherein the plurality of the grooves serving as a gas discharge path are formed by a gas flow channel forming member,
   the gas flow channel forming member has:
   a rectangular planar shape;
   a side surface shape including a flat plate portion and an inclined plate portion that is formed on a side of the diffuser portion;
   an arc-like cross-sectional shape in a width direction including a wavy portion, and a plurality of communication holes passing through the wavy portion in the thickness direction thereof; and
   a distance between adjacent apexes of the wavy portion, which is adjusted to be less than the minimum length of the molded article of the gas generating agent,
   in the gas flow channel forming member, the inclined plate portion is positioned on the side of the diffuser portion, and the flat plate portion is disposed along an inner circumferential wall surface of the cylindrical housing, and a space having an axially triangular cross sectional shape and charged with no molded article of the gas generating agent is present between the inclined plate portion and the inner circumferential wall surface of the cylindrical housing.

6. The gas generator according to claim 1, in which a filter is disposed between the diffuser portion and the combustion chamber charged with the molded article of the gas generating agent inside the cylindrical housing.

7. The gas generator according to claim 1, in which a filter is disposed between the diffuser portion and the combustion chamber charged with the molded article of the gas generating agent inside the cylindrical housing, and a partition wall having a through hole is disposed between the filter and the combustion chamber, spaced in an axial distance from the filter.

8. The gas generator according to claim 5, in which a filter is disposed between the diffuser portion and the combustion chamber charged with the molded article of the gas generating agent inside the cylindrical housing.

9. The gas generator according to claim 7, wherein the partition wall has a cup shape including a bottom surface and a circumferential surface that has a plurality of through holes, respectively, and an interior of the cup-shaped partition wall is not charged with the molded article of the gas generating agent and a disk-shaped space is presented therein.

10. The gas generator according to claim 4, further comprising a curved surface portion provided at each end of the wavy portion and abutting against an inner circumferential wall surface of the cylindrical housing.

* * * * *